Patented Oct. 10, 1922.

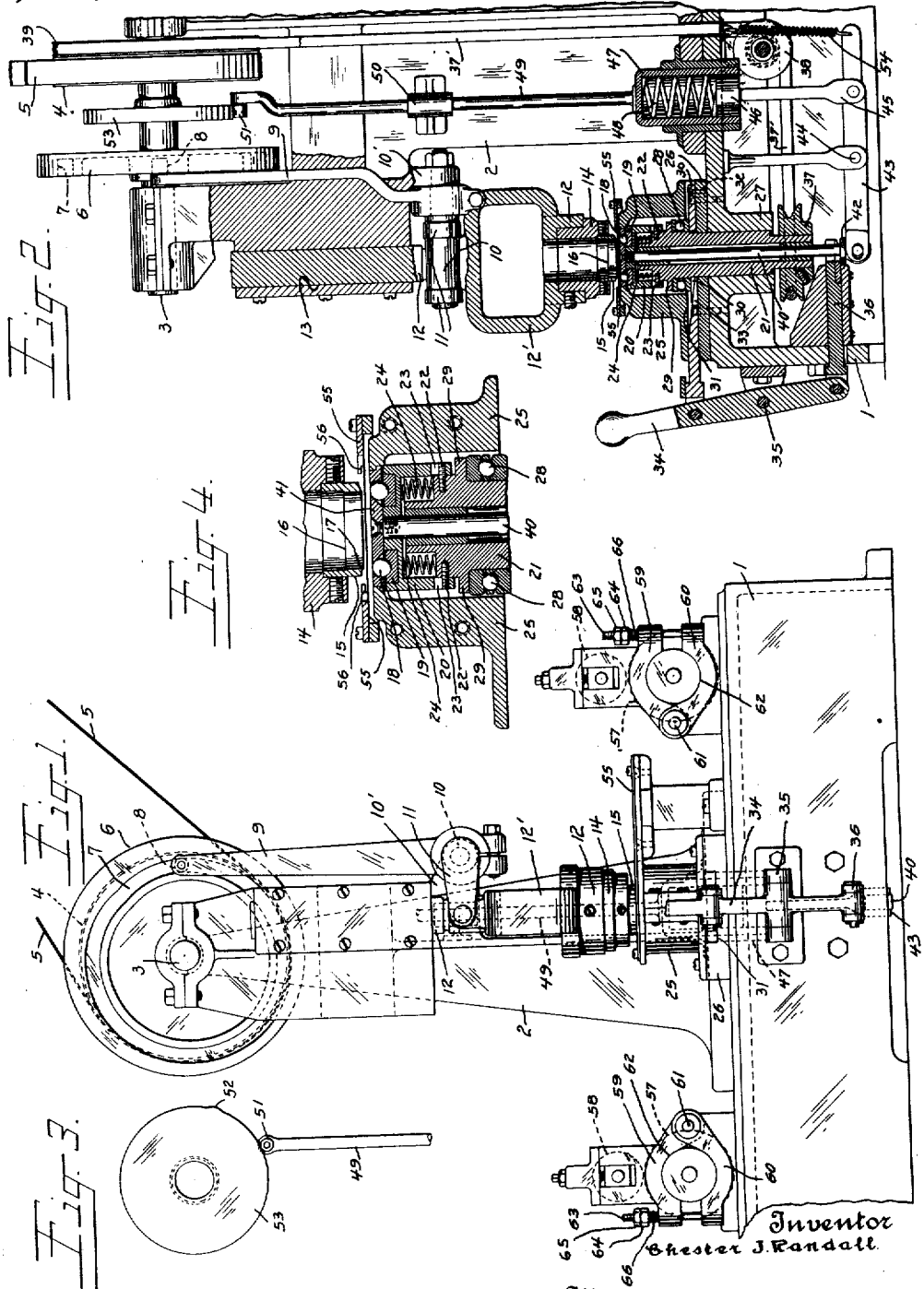

1,431,541

UNITED STATES PATENT OFFICE.

CHESTER J. RANDALL, OF NAUGATUCK, CONNECTICUT, ASSIGNOR TO THE GOODYEAR'S METALLIC RUBBER SHOE COMPANY, A CORPORATION OF CONNECTICUT.

MACHINE FOR CUTTING DISKS FROM SHEET MATERIAL.

Application filed May 24, 1920. Serial No. 383,620.

*To all whom it may concern:*

Be it known that I, CHESTER J. RANDALL, a citizen of the United States, residing at Naugatuck, county of New Haven, and State of Connecticut, have invented a certain new and useful Machine for Cutting Disks from Sheet Material, of which the following is a full, clear, and exact description.

This invention relates to a machine for cutting disks from sheet material, more particularly to a machine for cutting printed labels in disk form from a strip of rubber, which labels may be attached to various rubber articles such as footwear.

Owing to the peculiar nature of rubber it is impracticable to cut these labels by an ordinary die and it has been common previously to my invention to cut the labels by hand from the strip, which is a laborious and time consuming operation.

An object of my invention is to provide a simple and effective machine for automatically cutting the labels from a printed strip.

Another object is to provide means for preventing the cutting of defective labels without the necessity of stopping the machine.

Still another object is to provide an effective means for ejecting the cut labels from the strip.

A further object is to provide a machine in which the necessity for sharpening the cutting die is obviated.

Still further objects will appear from the detailed description.

In the drawings, Fig. 1 is a front elevation of the machine;

Fig. 2 is a transverse vertical section, showing certain of the parts in elevation;

Fig. 3 is a detail of one of the operating cams, and

Fig. 4 is an enlarged detail section of the cutting die and rotary anvil.

Referring to the drawings the numeral 1 designates a base or support, from which arises a frame 2 carrying at its upper end a main shaft 3 mounted in suitable bearings, a drive pulley 4 being mounted on the shaft and carrying a belt 5 connected to any suitable source of power. Mounted on the shaft 3 is a cam wheel 6 provided with a cam groove 7, in which is disposed a follower 8 carried by the upper end of an arm 9 rigidly connected to a sleeve 10, mounted on a shaft carried by the bracket 10' projecting from the frame 2. Also projecting from the sleeve 10 is a pair of spaced arms 11 to the ends of which is pivotally connected a plunger 12, the upper end of which is guided in a channel 13 formed in the frame 2. The lower portion of the plunger 12 is enlarged to form a yoke 12' terminating in a tubular sleeve in which is secured a tubular die head 14, the latter in turn having adjustably mounted therein a tubular cutting die 15. The upper portion of the cutting die is counter-bored as shown at 16 and its lower end is beveled at 17 to form a cutting edge.

Coacting with the cutting die is an annular rotatable anvil formed by a circularly arranged series of balls 18 mounted in a ball race 19, the latter being carried by a sleeve 20 slidably connected with a rotatable spindle 21 by means of pins 22 on the spindle movable in slots 23 in the sleeve. Springs 24 interposed between the head of the sleeve 20 and a shoulder on the spindle 21 form a yieldable mounting for the sleeve and the ball anvil carried thereby. A casing 25 surrounds the anvil and upper end of the rotatable spindle 21, said casing being supported by a base 26 resting upon the support 1. The support 1 is provided with a sleeve 27 and the spindle 21 is slidable in the base 26 and sleeve 27. Surrounding the spindle 21 within the casing 25 is a ball thrust bearing 28, which is held between a flange 29 on the spindle and a forked wedge member 30 surrounding the spindle and having a limited vertical movement in the channel 31 formed in the base 26, end movement of said wedge member 30 being prevented by steady pins 32. The forked wedge member 30 and supported spindle 21 are raised by a coacting forked wedge member 33 engaging the member 30 and longitudinally slidable in the channel 31, reciprocatory movement being imparted to the wedge member 33 by an operating lever 34 having a pin and slot connection with its outer end, the lever being pivotally mounted at 35 on the support 1. The lower end of the lever 34 has a pin and slot connection with a forked locking bar 36, the purpose of which will be later explained. Secured to the lower end of the spindle 21 is a pulley 37 the belt 37' of which passes over idler pulleys 38 and thence over the drive pulley 39 mounted on the main shaft. Slidably mounted in the spindle 21 is a plunger rod 40 carrying at its upper end a plunger head 41 and having adjacent its lower end a locking flange 42 adapted to coact with the locking bar 36. Pivotally connected to the lower end of the plunger rod 40 is a lever 43 fulcrumed at 44 and having pivotally connected to it adjacent its other end a link 45 carrying a plunger 46, said plunger being slidable in a cylinder 47 slidably mounted in the support 1, a coil spring 48 being interposed between the head of the cylinder 47 and the plunger 46. Secured to the head of the cylinder 47 is a plunger rod 49 reciprocable in the bearing 50 and carrying at its upper end a cam roller 51 coacting with the peripheral cam 52 on the cam wheel 53 mounted on the main shaft 3. A coiled return spring 54 is secured to the end of lever 43 and to the support 1. A pair of opposed guide plates 55 having undercut edges 56 provide a guide channel for feeding the label strip between the die and anvil.

The cutter shown is intended to be used in conjunction with a label printing mechanism, not shown, and forming no part of the present invention, the strip having the printed labels thereon being fed from the printing mechanism to and through the cutting mechanism by a pair of feed devices. Each feed device comprises a lower roll 57, which may be intermittently driven in any desired manner, as by a pawl and ratchet, and coacting with the lower roll is a spring pressed idler roll 58. In order to prevent overthrow of the lower driven roll brake members 59 and 60 are provided, said members being pivotally mounted at 61 and adapted to frictionally contact with the braking surface 62 provided on the roll. A pin 63 secured to the brake member 60 passes freely through the end of the brake member 59 and its threaded end is provided with an adjusting nut 64 and lock nut 65, a coiled compression spring 66 being interposed on the rod 63 between the adjusting nut 64 and end of the brake member 59. The drive for the specific feed devices disclosed has not been shown as the feed devices form no part of the present invention and any suitable feed mechanism may be used.

In operation the printed label strip is fed through the cutting mechanism by the feed devices and passes through the guide channel formed by the plates 55 and between the cutting die and anvil. The lever 34 is pressed in toward the machine, thereby lifting the anvil to operative position, and as the printed label strip is intermittently fed through the machine the cutting die 15 is intermittently brought into coaction with the anvil through the mechanism operated by the cam wheel 6. The cam 52 is so timed that at the finish of each cutting operation it acts upon the cam roller 51 to depress the plunger rod 49 and cylinder 47, which latter through the intermediary of the spring 48, plunger 46, link 45, lever 43 and plunger rod 40 resiliently elevates the plunger head 41 to project the cut label upwardly within the cutting die 15. The stroke of the plunger rod 40 is of just sufficient length to project the cut label into the counter-bore 16, the shoulder at the bottom of which prevents any retrograde movement of the label, and after a sufficient number of labels have been cut they are ejected within the yoke 12' and may be removed. Should the operator detect a defective label in the strip as it is fed to the cutting die he momentarily draws out the lever 34 at the proper time, thereby allowing the anvil to be depressed from operative relation with the cutting die and at the same time projecting the forked stop bar 36 inwardly until it passes over the flange or shoulder 42, thereby locking the label ejecting plunger 41 against upward movement. By reason of the resilient connection 46, 47 and 48 in the operating mechanism for the plunger head, the necessity for stopping the machine during this operation is obviated. The springs 24 furnish a resilient mounting for the ball anvil 13, thereby allowing the anvil to yield if by chance any hard object should be fed between the die and anvil and preventing injury to the die or anvil. They also maintain the balls in contact with the die, irrespective of irregularities in its edge or slight tilting of the die.

While the cutting die has been shown with a beveled edge 17 this is not essential, due to the rolling action of the anvil 18, and the only difference is that when a die which is not sharp is used the cut edge of the label will be more or less beveled, which in certain instances is desirable. It is obvious that the die and anvil need not necessarily be circular in shape, but may be elliptical or of other closed form, and rollers may be used instead of balls.

While in the present instance a specific disclosure of the drive means for the cutting die and anvil has been made, it is evident that any other suitable mechanism may be used, and in particular the belt 37' may be driven independently if desired. As the rotatable spindle and ball anvil carried thereby should be driven at a relatively high speed, such independent drive may be advisable.

It is evident from the disclosure that the device is not limited in its use to the cutting of labels, but may be used for cutting other articles of a similar shape.

Such other changes may be made in the mechanism as the present disclosure would suggest to one skilled in the art, without departing from the scope of the appended claims.

Having thus described my invention, what I claim and desire to protect by Letters Patent is:

1. In a disk cutting machine, a die, an anvil, means for bringing said parts into and out of cutting relation, means independent of said first means for rendering them inoperative, means for giving them an additional relative movement during said first movement, means for removing the cut disk from the path of the material from which it is cut, and means coacting with said independent means for rendering said disk removing means inoperative.

2. In a disk cutting machine, a die, an anvil including a series of spaced movable faces coacting with the die, means for relatively reciprocating the die and anvil, means for simultaneously causing different portions of said faces to be presented to the die, and means for at will rendering the anvil inoperative while the machine is running.

3. In a disk cutting machine, a reciprocating die, a yieldingly mounted anvil including a series of closely spaced movable faces coacting with the die, and means for causing different portions of said faces to be presented to the die during the cutting operation.

4. In a disk cutting machine, a reciprocating die, a yieldingly mounted anvil including a series of closely spaced movable faces coacting with the die, and means for rotating the anvil.

5. In a disk cutting machine, cooperating cutting devices, one of which contacts at all points with the material to be cut and the other of which contacts at spaced points, means for automatically intermittently bringing said devices into cutting relation, means for at will rendering one of said devices inoperative, and means for relatively rotating said devices.

6. In a disk cutting machine, cooperating cutting devices, one of which carries a cutting edge and the other of which carries cooperating movable cutting elements, automatic means for reciprocating said edge, manual means for disposing said movable elements in co-operative relation therewith, and means for rotating one of the cutting devices relatively to the other.

7. In a disk cutting machine, a continuously reciprocatory die, a yieldingly mounted anvil cooperating therewith, means for rotating said anvil, means for centering a strip of material with relation to the die and anvil, and means for removing cut disks from the path of the material.

8. In a disk cutting machine, a die, an anvil, means for reciprocating one of them, means for moving the other to an inoperative position when desired, and means for relatively rotating the die and anvil.

9. In a disk cutting machine, a die, an anvil, means for relatively reciprocating them, means for relatively rotating them, automatic means for removing cut disks from the path of the material, and means for at will rendering said last means inoperative.

10. In a disk cutting machine, a die, an anvil, means for relatively reciprocating them, means for simultaneously relatively rotating them, means for removing cut disks from the path of the material, and means for operating said last means including a lost motion connection.

11. In a disk cutting machine, a die, an anvil, means for relatively reciprocating them, means for relatively rotating them, means for removing cut disks from the path of the material, and means for operating said last means including a yielding connection.

12. In a disk cutting machine, a die, an anvil, means for relatively reciprocating them, means for relatively rotating them, means for removing cut disks from the path of the material, a continuously operating driving means for said last means including a yielding connection, and means for locking the disk removing means against movement.

13. In a disk cutting machine, an annular cutting die, an annular anvil, means for bringing said parts into cutting relation, means for rotating one of them during said first movement, means for directing the cut disks through one of said annular parts, and means for preventing the return of disks so directed.

14. In a disk cutting machine, a reciprocable annular cutting die, an annular anvil formed of a series of closely spaced balls, means for bringing the die and anvil into cooperative relation diametrically of each ball, and means for relatively rotating them.

15. In a disk cutting machine, a reciprocable annular cutting die, an annular anvil formed of a series of closely spaced balls, means for bringing the die and anvil into cooperative relation diametrically of each ball, means for relatively rotating them, means for removing the cut disks from the path of the material from which they are cut, and means governed by said first means for rendering the disk removing means inoperative.

16. In a disk cutting machine, a reciprocatory die, an anvil coacting therewith, means for removing the cut disks from the path of the material, means for moving the anvil to an inoperative position, and means for locking the disk removing means against operation.

17. In a disk cutting machine, an annular cutting die, means for reciprocating the same, an annular rotatable anvil including a series of balls coacting with the die, means for removing the cut disks from the path of the material, and means for simultaneously moving the anvil to an inoperative position and locking the disk removing means against operation.

18. In a disk cutting machine, an annular reciprocatory die, an annular rotatable anvil, means for projecting the cut disk through the die, and means for simultaneously moving the anvil to an inoperative position and locking the disk projecting means against operation.

19. In a label cutting machine, an annular cutting die, means for intermittently reciprocating the same, an annular yieldably supported anvil comprising a series of balls mounted in a raceway and adapted to coact with said die, means for rotating said anvil, means for projecting cut labels within the die, and means for simultaneously moving said anvil to an inoperative position and locking said label projecting means against movement.

20. In combination, a raceway in the form of a closed figure, a series of closely spaced members movably mounted in said raceway and forming an anvil, a reciprocatory die coacting with said members, means for at will rendering the anvil inoperative, and means for causing a rolling contact between said die and members.

Signed at Naugatuck, Conn., this 19th day of May, 1920.

CHESTER J. RANDALL.